United States Patent [19]

Gehl et al.

[11] 4,264,931

[45] Apr. 28, 1981

[54] IMPLOSION PROTECTION FOR TV TUBES

[75] Inventors: Lawrence J. Gehl; John L. Webb, Jr., both of Corning, N.Y.

[73] Assignee: Corning Glass Works, Corning, N.Y.

[21] Appl. No.: 29,555

[22] Filed: Apr. 13, 1979

[51] Int. Cl.3 .......................... H04N 5/65; H01J 61/30

[52] U.S. Cl. ................................ 358/245; 220/2.1 A

[58] Field of Search ....................... 358/245, 246, 247; 220/2.1 A, 2.3 A; 215/32

[56] References Cited

U.S. PATENT DOCUMENTS

| | | | |
|---|---|---|---|
| 1,127,497 | 2/1915 | O'Malley | 215/32 |
| 1,300,917 | 4/1915 | Bergen | 215/32 |
| 2,123,957 | 7/1938 | Orth | 250/27.5 |
| 2,236,708 | 4/1941 | Grimditch | 250/164 |
| 2,486,321 | 10/1949 | O'Sullivan | 215/32 |
| 2,799,123 | 7/1957 | Van Steenis | 49/82 |
| 2,907,906 | 10/1959 | Swedlund | 313/64 |
| 3,591,035 | 7/1971 | Gossie | 220/2.1 A |

FOREIGN PATENT DOCUMENTS

| | | | |
|---|---|---|---|
| 1242763 | 6/1967 | Fed. Rep. of Germany | 220/2.1 A |

*Primary Examiner*—Joseph A. Orsino, Jr.
*Attorney, Agent, or Firm*—John P. DeLuca; Burton R. Turner

[57] ABSTRACT

There has been provided a television tube having funnel, panel, and neck portions fused together in a conventional manner. A controlled failure zone in the form of a circumferential implosion protection notch is formed in a rearward portion of the funnel for establishing a stress concentration location, such that, in the event of a destructive impact to the panel, the tube will crack along the notch in the controlled failure zone and reduce the implosion potential of the tube.

19 Claims, 6 Drawing Figures

IMPLOSION PROTECTION FOR TV TUBES

BACKGROUND OF THE INVENTION

This invention relates to a novel vessel or envelope structure which is adapted for use in the manufacture of cathode ray tubes and the like. More particularly, the invention relates to a color television tube which sustains itself against very low internal pressure.

In FIG. 1, a prior art color television tube 10 is illustrated schematically. A panel 11, a funnel 12 and a neck 13 are each formed and fused together in a conventional manner. A pin and gun support 14 is inserted in an open end 15 of the neck 13 and sealed therein. The entire tube 10 is evacuated in a conventional manner and one of various implosion protection devices may be used, such as a shrink fit band (not shown) or an epoxied rim band with a compression device located thereover known as a tension or "T" band 16. Shrink fit and "T" bands are compressively disposed about the perimeter of the panel 11 in one of various ways known in the art. Reference will be made to the "T" band 16 hereinafter for convenience only and it should be understood that other implosion protection devices of its type may be used. A force f represents a destructive impact on the panel 11 and the T band 16 exerts a radial force on the panel 11 in order to reduce the propagation of cracks caused by the destructive force f so that the tube 10 slowly devacuates in a manner which will prevent implosion.

Recent developments in the picture tube art have permitted manufacturers to increase the size of TV picture tubes substantially. As the size of television tubes increases, the size, strength, and complexity of the T band arrangement must be greatly increased. For example, a test conducted by Underwriters' Laboratories Inc. subjects the frontal portion of the panel 11 to an impact of about 15 foot pounds delivered by a five pound missile. The amount of energy dissipated by the panel 11 is sufficient to destroy the tube so that glass fragmentation can be observed. Because of the nature of the test, it is necessary to design implosion protection systems to insure successful results should an implosion occur during normal use. This design requirement becomes increasingly difficult with the larger tubes since the evacuated space within the tube 10 and the stresses on the panel face 11 are progressively increased by the larger surface area of the panel 11.

Thus, the present invention has been made in order to supplement the conventional TV implosion protection devices, e.g., the T band 16 and others, in such a way that a reliable outgassing or devacuation of the tube will occur without the necessity of increasing the hardware required for the conventional implosion protection.

Figure 3:
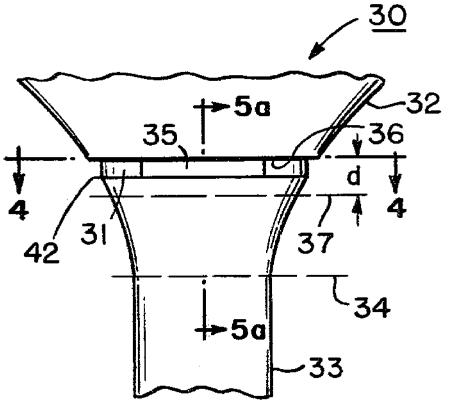
FIG. 3 is another embodiment of the improved television tube of FIG. 2.

FIG. **5*a* is a fragmented side sectional view of the tube of FIG. 3 taken along line 5*a*—5*a*** thereof.

Figure 5A:
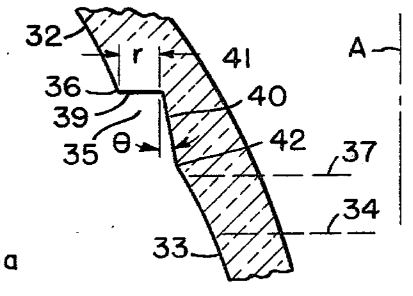

FIG. **5*b* is a fragmented side sectional view of a variation of the embodiment of FIG. 5*a***.

SUMMARY OF THE INVENTION

There has been provided a television tube having funnel, panel, and neck portions fused together in a conventional manner. A controlled failure zone in the form of a circumferential implosion protection notch is formed in a rearward portion of the funnel for establishing a stress concentration location, such that, in the event of destructive impact to the panel, the tube will crack along the notch and reduce the implosion potential of the tube.

DESCRIPTION OF THE PREFERRED EMBODIMENT

Figure 1:
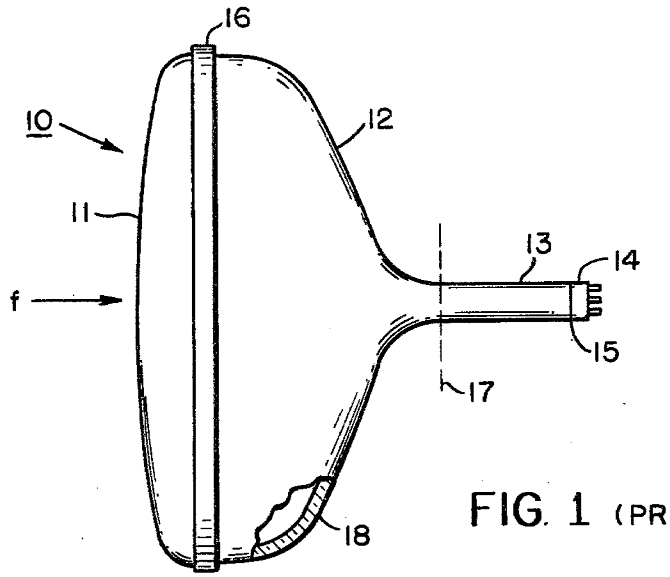
FIG. 1 (PRIOR ART)
FIG. 1 is a schematic diagram of a prior art TV tube showing conventional components and their environment in a side elevation.

In the conventional color television tube of FIG. 1, the destructive force f delivered by the typical test arrangement should be sufficient to crack the panel 11 causing a severe and rapid devacuation of the tube without implosion. As mentioned previously, the T band 16 reduces the severity of such a rapid devacuation, thereby reducing the implosion potential of the tube 10.

Figure 2:
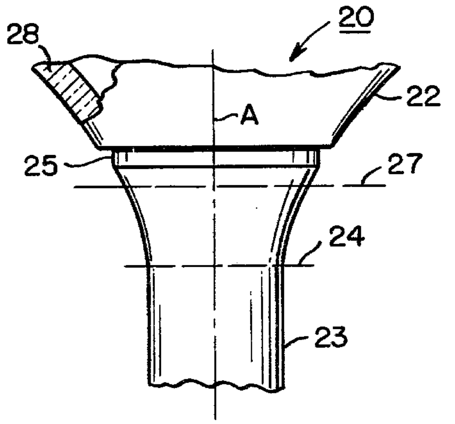
FIG. 2 is a fragmented side elevation of a neck and funnel portion of an improved television tube according to the present invention.

In FIG. 2, a fragmented side view of an improved tube 20 including a portion of the funnel 22 and neck 23 is illustrated. Since other portions of the tube are similar to those shown in FIG. 1, they are not shown. The funnel 22 and neck 23 are fused along a parting line 24. A controlled failure zone could be formed by any reliably formed surface abberation or controlled surface discontinuity such as a ground scratch or groove. In the present invention, the surface discontinuity is preferably in the form of a molded groove 25 located just forward of a location known as a reference line 27 for the tube 20. The groove 25, sometimes referred to as a stress concentration notch, is circumferentially disposed about the rearward portion of the neck 22 in a plane perpendicular to a longitudinal axis A of the tube 20. It has been found that, during testing according to the impact conditions set forth above, many television tubes of a conventional design tend to crack in the vicinity of the reference line 27. It is commonly known in the art as: a line formed by the intersection of the funnel 22 with a plane perpendicular to the axis A of the tube 20 and passing through an empirically determined apex of beam deflection from the gun (not shown), (see also reference line 17 in FIG. 1). Thus, the present invention tends to amplify the tendency of the tube 20 to crack off in a controlled manner and location along groove 25.

It is not completely understood what the mechanism is for the propagation of shock waves and cracks in glass. However, it is believed that the shock propagation is substantially faster than crack propagation, and thus in the example illustrated in FIG. 1, if the force f causes a sufficient portion of the panel 11 to cave in, the shock produced by the force f will propagate its way along walls 18 of the tube 10 more rapidly than cracks produced in the surface of the panel 11. In FIG. 2, if the shock waves caused by the force f travel along walls 28 of the funnel 22 to the stress concentration notch 25, the discontinuous nature of the controlled failure zone produced by notch 25 will cause the shock wave to concentrate in that zone and result in a controlled failure of the tube through a crack off of neck 23. Thus, the tube 20 will devacuate rapidly but in a manner designed to relieve the implosion potential of the tube 20, and at a location where physical injury is remote.

It should be realized that the T band 16 illustrated in FIG. 1 also protects the tube 20 from implosion. However, since the stress concentration notch 25 provides a reliable source for the location of a crack off, the T band 16 for the larger types of tubes need only be of a conventional design and sufficiently strong to protect the tube 20 from implosion for a time sufficient for the shock to propagate to the stress concentration notch 25.

In FIG. 2, the stress concentration notch 25 is a continuous circumferential groove. It has been found that other designs are possible. For example, in the arrangement illustrated in FIG. 3, a tube 30 has a stress concentration notch 35 in a location similar to that illustrated in FIG. 2 (i.e. at a rearward portion of funnel 32 near reference line 37), but the notch 35 is segmented and has intermediate solid portions 31.

Figure 4:
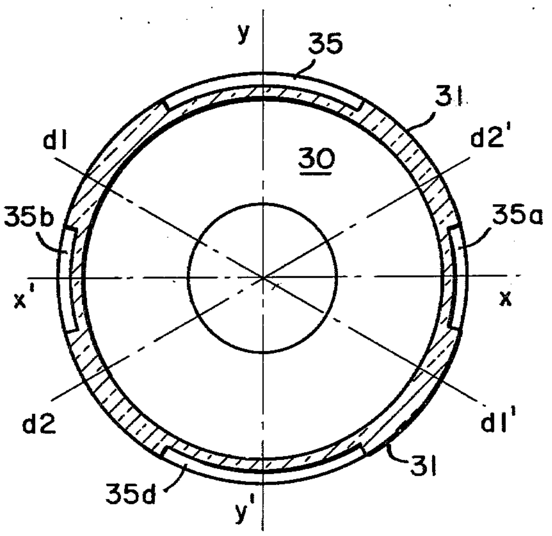
FIG. 4 is a sectional view of the tube of FIG. 3 taken along line 4—4 thereof.

This feature is more clearly illustrated in FIG. 4, which is a cross section of the tube 30 taken along line 4—4 of FIG. 3 at leading edge 36 of the notch 35. The hatched portions of the sectional drawing of FIG. 4 represent the conventional cross section of the tube 30 and the unhatched sections represent the recesses or perforations 35*a*–35*d* of stress concentration notch 35. In this arrangement, it has been found that, the notch portions 35*a* and 35*b* ought to be established along major axis (x—x') of the rectangular tube 30 and larger notch portions 35*c* and 35*d* along minor axis y—y' thereof. Experience in testing has revealed that this arrangement provides a reliable failure zone by locating a predetermined crack source. Finally, the spaces between the notches 35, namely solid portions 31, are located along the diagonals d1—d1' and d2—d2' of the rectangular tube face. It was found that the tube 20 with a complete, circumferential notch 25 tended to break during processing. The design illustrated in FIG. 3 provides added strength, due to the presence of the solid material in the spaces 31, thereby tending to increase selections.

It can be observed from FIG. 4 that the notches 35*a*–35*d* may be regularly spaced about the funnel 32. However, they may have different arc lengths and be symmetrical only with respect to one or the other axes of the tube. In one experiment using a rectangular tube having a 25" 90° yoke, opposed notches 35*a* and 35*b* along major axis x—x' had an arc length of approximately ⅝ inch, while notches 35*c*–35*d* along minor axis Y—Y' were fixed at about 1¼ in. The notches 35*a*–35*d* were separated equally from each other by ⅝ in.

FIG. 5*a* is a detail of a portion of the stress concentration notch 35 of FIG. 3, taken along line 5*a*–5*a*, illustrating that the notch 35 has a selected profile. Beginning with leading edge 36 in the funnel portion 32, the notch 35 has a radial forward face 39 and an axially tapering circumferential face 40 intersecting at an inside corner 41. A trailing edge 42 of the circumferential face 40 meets a trailing portion of the funnel 32 near reference line 37 and thereafter joins with the neck 33 below parting line 34. The inside corner 41, should be sharp and may be produced by moulding, grinding or sand blasting or combinations thereof. It should be understood that moulding is a preferred arrangement since it is industrially convenient.

In one example, a 25" 90° yoke section was used for various experiments. It was discovered that the stress concentration notch 35 could be located so that the leading radial face 39 would be forward of the reference line 37 by a distance d of approximately 0.25 in. The radial face 39 could be an annulus having a width r of approximately 0.080 in., lying in a plane perpendicular to the axis A of the tube 30. The circumferential tapered face 40 could be tapered inwardly of the axis A by some acute angle $\theta$, which in the particular example is about 0.5 degree.

The location of stress concentration notch 25 for the tube 20 in FIG. 2 is similar to that described for FIG. 3 since there is sufficient glass wall thickness 28 to produce a strong tube 20 notwithstanding the notch 25. In the examples described herein, it would be preferable to mould the funnels 22 and 32 with the respective stress concentration notches 25 and 35 therein.

Figure 5B:
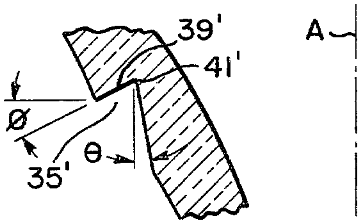

In another embodiment, shown in FIG. 5*b*, radial face 39' of notch 35' is offset from axis A by $\phi$ degrees. This configuration allows glass to flow more readily during moulding so that inside corner 41' might be more sharply formed. This configuration would contain a reliable stress concentration zone by virtue of the sharpness of inside corner 41'. While angle $\phi$ can range from about 0 degrees to about 10 degrees, the preferred arrangement calls for $\phi$ at about 3 degrees.

While there have been described what at present are considered to be preferred embodiments of the present invention, it will be obvious to those skilled in the art that various changes and modifications may be made therein without departing from the invention, and is intended the appended claims to cover all such changes and modifications as fall within the true spirit and scope of the invention.

What is claimed is:

1. In a television tube having a rearward neck, a funnel incorporating a reference line, and a forward panel, fused together in a conventional manner: a controlled failure zone in the form of an implosion protection notch formed in a rearward portion of the funnel forward of the reference line, said notch including a leading radial face lying transversely of a longitudinal axis of the tube and a circumferentially tapering face lying at an angle with respect to the radial face for establishing a stress concentration location, such that in the event of destructive impact to the panel, the neck and a rearward portion of the funnel of the tube will crack off in the controlled failure zone along the notch and reduce the implosion potential of the tube.

2. The tube of claim 1 wherein the notch comprises: a continuous circumferential groove in said funnel lying in a plane perpendicular to a longitudinal axis of the tube.

3. The tube of claim 1 wherein the notch comprises: a discontinuous circumferential groove formed in the said funnel lying in a plane perpendicular to a longitudinal axis for said tube.

4. The tube of claim 1 wherein the radial face and tapering face meet at a relatively sharp interface.

5. In a television tube having a rearward neck, a funnel incorporating a reference line, and a forward panel, fused together in a conventional manner: a controlled failure zone in the form of an implosion protection notch formed in a rearward portion of the funnel forward of said reference line, said notch including a plurality of opposed recesses formed circumferentially about a rearward portion of the funnel lying transversely with a longitudinal axis of the tube and wherein opposite ones of the formed recesses are of approximately equal length and are equally spaced from each other establishing a stress concentration location, such that in the event of destructive impact to the panel, the neck of the tube and a rearward portion of the funnel will crack off in the controlled failure zone along the notch and reduce the implosion potential of the tube.

6. The funnel of claim 5 wherein the notch includes: a plurality of opposed recesses formed of a pair of the radial and tapering faces and wherein opposite ones of the formed recesses are of approximately equal length and are equally spaced from each other.

7. The tube of claim 5 wherein opposed formed recesses lie along respective major and minor axes of the tube.

8. The tube of claim 5 having a 25" 90° funnel and wherein opposed recesses are located in wall portions of the funnel along the major and minor axes and have respective arc lengths of approximately ⅝ and 1¼ inch and are separated by funnel wall portions having arc lengths of approximately ⅝ inch.

9. The tube of claim 5 wherein each formed recess comprises: a radial face including a segmented annular portion disposed transversely with the longitudinal axis of the tube, and a segmented circumferential face lying at an acute angle with the longitudinal axis of the tube and forming an inside corner with corresponding portions of the segmented annular portion.

10. The tube of claim 9 wherein the radial face lies at an angle from about 0 to about 10 degrees rearward of said tube from a line perpendicular to said longitudinal axis.

11. The tube of claim 10 wherein said angle is about 3 degrees.

12. The tube of claim 9 wherein said circumferential face lies at an angle from about 0 to about 5 degrees rearward of said tube from a line perpendicular to said longitudinal axis.

13. The tube of claim 12 wherein said angle is about 0.5 degrees.

14. The tube of claim 9 wherein a reference line therefor is located in a rearward portion of the funnel and forward of the neck and the radial face has an annular dimension of about 0.080 in. transversely with the longitudinal axis of the tube and lies about 0.25 in. forward of the reference line.

15. A method of forming a television tube having implosion protection, wherein a neck, funnel incorporating the reference line and panel are fused together in a conventional manner, comprising the steps of: establishing a position in a rearward portion of the funnel forward of the reference line near where the funnel and neck are fused together, forming a controlled failure zone in the form of a discontinuous notch in the vicinity of said position and thus establishing a stress concentration location, such that, in the event of a destructive impact to the panel, the neck and a rearward portion of the funnel of the tube will crack off along the notch in the controlled failure zone and reduce the implosion potential of the tube.

16. The method of claim 15 including the step of forming a circumferential groove in the funnel adjacent the position.

17. The method of claim 15 including the step of forming a segmented circumferential groove in the funnel in the vicinity of the position.

18. A funnel incorporating a reference line for use in a television tube having a controlled failure zone in the form of at least one implosion protection notch including a leading radial face lying transversely of a longitudinal axis of the tube and a circumferentially tapering face lying at an angle with respect to the radial face formed in a rearward portion of the funnel forward of said reference line, said notch establishing a stress concentration location, such that in the event of destructive impact to the tube, the funnel will be susceptible to failure in the controlled failure zone along the notch and reduce the implosion potential of the tube.

19. A method of forming a television tube funnel incorporating a reference line, said funnel having implosion protection, comprising the steps of: establishing a position in a rearward portion of the funnel, forming a controlled failure zone in the form of a discontinuous notch in the vicinity of said position forward of the reference line and thus establishing a stress concentration location, such that, in the event of a destructive impact to the tube, the funnel will be susceptible to failure in the controlled failure zone and reduce the implosion potential of the tube.

* * * * *